United States Patent [19]

Tadokoro et al.

[11] Patent Number: 4,562,804

[45] Date of Patent: * Jan. 7, 1986

[54] INTAKE SYSTEM FOR ROTARY PISTON ENGINE

[75] Inventors: Tomoo Tadokoro; Haruo Okimoto; Ikuo Matsuda, all of Hiroshima, Japan

[73] Assignee: Mazda Motor Corporation, Hiroshima, Japan

[*] Notice: The portion of the term of this patent subsequent to Jan. 7, 2003 has been disclaimed.

[21] Appl. No.: 542,584

[22] Filed: Oct. 17, 1983

[30] Foreign Application Priority Data

Oct. 15, 1982 [JP] Japan ................... 57-181961
Oct. 22, 1982 [JP] Japan ................... 57-186354
Nov. 30, 1982 [JP] Japan ................... 57-210349

[51] Int. Cl.$^4$ ............................................. F02B 53/04
[52] U.S. Cl. .................................. 123/216; 123/242
[58] Field of Search ............... 123/216, 242, 52 M, 123/219

[56] References Cited

U.S. PATENT DOCUMENTS 3,491,733  1/1970  Soubis .
4,020,800  5/1977  Ishikawa ........................... 123/219
4,425,883  1/1984  Tadokoro et al. .................. 123/216

FOREIGN PATENT DOCUMENTS

99827  3/1978  Japan ................................. 123/216

Primary Examiner—Michael Koczo
Attorney, Agent, or Firm—Fleit, Jacobson, Cohn & Price

[57] ABSTRACT

A two rotor type rotary piston engine includes an intake system including individual intake ports provided in at least one of the intermediate and side housings to open to the respective rotor cavities and adapted to be cyclically closed by the rotors as the rotors rotate, an intake passage including a throttle valve and individual passages leading respectively to the intake ports and communicated with each other by communicating passages downstream of the throttle valve. The intake port has an opening period of 270° to 320° in terms of the angle of rotation of the eccentric shaft, the communication passages and the individual passages leading to the respective rotor cavities having overall length between 0.57 and 1.37 m so that a compression wave produced in one individual passage in opening timing of one intake port is transmitted to the other intake port just before the other intake port is closed to obtain an additional charge under an engine speed range of 5000 to 7000 rpm.

9 Claims, 11 Drawing Figures

INTAKE SYSTEM FOR ROTARY PISTON ENGINE

The present invention relates to rotary piston engines, and more particularly to intake systems for rotary piston engines. More specifically, the present invention pertains to side port type intake systems for two-rotor rotary piston engines.

In general, a rotary piston engine includes a casing comprised of a rotor housing having an inner wall of trochoidal configuration, a pair of side housings secured to the opposite sides of the rotor housing to define a rotor cavity in the rotor housings. A rotor of substantially polygonal configuration is disposed in the rotor cavities and has flanks which define, with the inner wall of the rotor housing, working chambers having volumes which are cyclically changed as the rotor rotates. The rotor housing is generally formed with an exhaust port whereas the side housings are formed with intake ports so that intake, compression, combustion, expansion and exhaust cycles are conducted sequentially in each of the working chambers.

In this type of rotary piston engines, it has been proposed to utilize pulsations in the intake passage so that effective feed of intake gas can be accomplished throughout a wide range of the engine operating speed. For example, the U.S. Pat. No. 3,491,733 issued on Jan. 27, 1970 to Soubis et al. teaches to separate the intake passage into two passages of different lengths and connect these separated passages to two separated intake ports having different port closing timing so that the two passages and the two intake ports are used under a high speed engine operation whereas only one passage and only one intake port having earlier port closing timing are used under a low speed engine operation. With this arrangement, it is possible to feed the intake charge with resonance under a wide engine operating speed.

It should however be noted that the U.S. patent relates to a single rotor type rotary piston engine and there is no precise teaching as to how the pulsations in the passages are utilized. Further, the U.S. patent discloses a so-called peripheral port type rotary piston engine having the intake ports provided in the rotor housing. This type of engine is considered disadvantageous in that the intake ports are overlapped with the exhaust port so that the exhaust gas is blown under its own pressure into the intake working chamber decreasing the intake gas charge. In engines of recent years, there is a tendency that the exhaust gas pressure is increased due to facilities for suppressing engine noise and for purifying engine exhaust gas. In engines having turbo-superchargers, the exhaust gas pressure is further increased. Therefore, the peripheral port type intake system is not satisfactory to increase the intake charge utilizing the resonance effect.

It is therefore an object of the present invention to provide an intake system for two-rotor type rotary piston engines in which pulsations in intake passages can effectively be utilized to increase the intake gas charge.

Another object of the present invention is to provide a side port type intake system for two-rotor type rotary piston engines in which pulsations in the intake passage for one rotor cavity are utilized to increase the charge in the other rotor cavity.

A further object of the present invention is to provide a side port type intake system for two-rotor type rotary piston engines which can effectively produce a pressure resonance effect in high speed engine operating range to obtain an increased intake charge.

The present invention is based on the findings that a compression wave is produced in the vicinity of the intake port when the port is opened under the influence of the pressure of the residual combustion gas and that there is a tendency in recent engines that the compression wave is intensified due to the increase in the exhaust gas pressure. Thus, according to the present invention, the compression wave produced in one intake passage leading to one rotor cavity is transmitted through the other intake passage leading to the other rotor cavity to the intake port just before the other intake port is closed under a high engine speed, particularly, under an engine speed range between 5000 and 7000 rpm.

According to the present invention, there is therefore provided a two rotor type rotary piston engine including a casing comprised of a pair of rotor housings each having an inner wall of trochoidal configuration, an intermediate housing located between the rotor housings and a pair of side housings secured to outer sides of the respective rotor housings to define rotor cavities in the respective rotor housings, a pair of substantially polygonal rotors disposed in the respective rotor cavities with apex portions in sliding engagement with the inner walls of the respective rotor housings to define working chambers of cyclically variable volumes, said rotors being carried by eccentric shaft means so that said rotors are rotated with 180° phase difference in terms of angle of rotation of said eccentric shaft means, intake means including individual intake port means provided in at least one of said intermediate and side housings to open to the respective rotor cavities and adapted to be cyclically closed by said rotors as the rotor rotates, intake passage means including throttle valve means and individual passage means leading respectively to said intake port means and communicated with each other by communicating passage means downstream of said throttle valve means, said intake port means having opening period of 270° to 320° in terms of the angle of rotation of said eccentric shaft means, said communication passage means and said individual passage means leading to the respective rotor cavities having overall length between 0.57 and 1.37 m so that a compression wave produced in one individual passage means in opening timing of one intake port means is transmitted to the other intake port means just before said other intake port means is closed to obtain an additional charge under an engine speed range of 5000 to 7000 rpm. In a preferable aspect of the present invention, the communication passage means includes surging chamber means having an increased volume. The intake port means may be provided in both side housings as well as the intermediate housing. The intake port means formed in the intermediate housing and leading to the respective rotor cavities may be connected respectively with individual intake passage means which are communicated with each other by communicating passage means and, similarly, the intake port means formed in the side housings may be connected respectively with further individual intake passage means which are connected with each other by further communicating passage means. In such an arrangement, one of the sets of the intake and communication passage means leading to either the intake port means in the intermediate housing or the intake port means in the side housings may have the aforementioned overall length and this particular set of passage means may be substantially closed under a light load engine operation.

According to the present invention the aforementioned engine speed range is determined in view of the fact that most of the engines are designed to produce the highest output power in this speed range so that the most significant improvement can be obtained in respect of increase in the intake charge and the output power. The intake port opening period shall be more than 270° in term of the angle of rotation of the eccentric shaft because this value is the period between the intake top dead center and the intake bottom dead center and the intake action can be effected at least in this period. It should however be noted that, in choosing the intake port opening period of 270°, the opening and closing timings of the intake port should not be exactly at the top and bottom dead centers but preferably be retarded therefrom taking into account the possible delay of the intake gas flow due to the inertia of the intake gas. The upper limit value 320° of the intake port opening period is determined from the viewpoint of avoiding two adjacent working chambers being communicated each other through the intake port. In actual practice, the working chambers are separated by side seals provided on side surface of the rotor so that the actual intake port opening period is increased by approximately 40° than the value calculated geometrically based on the configuration of the rotor. Therefore, the intake port opening period is usually determined taking the positions of the side seals into account. However, in determining the above upper limit value, it is not necessary to take into account the positions of side seals because in high engine speed range which the present invention is concerned with the small clearance formed between the side surface of the rotor and the side or intermediate housing does not have any influence.

It is important to locate the communication passage downstream of the throttle valve because otherwise the throttle valve will produce a resistance to the propagation of the compression wave. The overall length of the communication and individual passages is obtained by the formula $$L = (\theta - 180 - \theta_o) \times 60/360N \times C \quad (1)$$

where:
L is the overall length;
$\theta$ is the intake port opening period;
N is the engine speed;
C is the sonic speed;
$\theta_o$ is the inactive period which is the sum of the period between the opening timing of the intake port and generation of the compression wave, and the period required for accomplishing a satisfactory charge increase before the full close of the intake port, and this inactive period is approximatey 20°.

It will thus be understood that the term $(\theta - 180 - \theta_o)$ represents the angle of rotation of the eccentric shaft corresponding to the period from generation of the compression wave at one intake port to the time at which the compression wave reaches the other intake port.

The term 60/360N represents the time period required for one revolution of the engine. Since the sonic speed C is 343 m/sec. at the ambient temperature of 20° C., the length L becomes 0.57 to 1.37 m for the engine speed N of 5000 to 7000 rpm. In the equation (1), the influence of the intake air flow in the propagation of the compression wave is neglected because the intake flow speed is small in relation to the sonic speed.

The above and other objects and features of the present invention will become apparent from the following descriptions of preferred embodiments taking reference to the accompanying drawings, in which.

Figure 1:
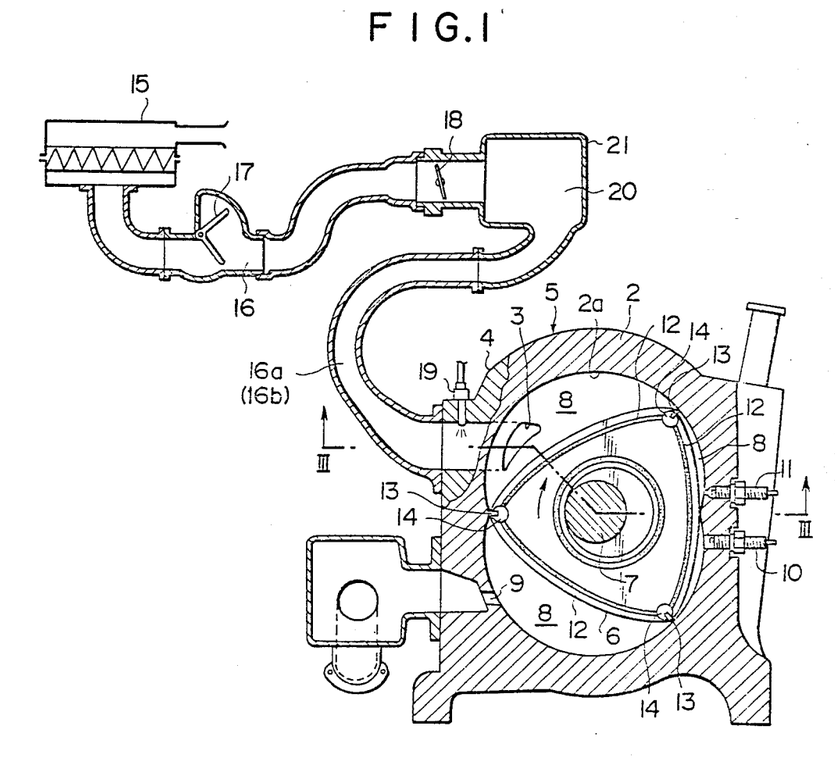
FIG. 1 is a sectional view of a rotary piston engine in accordance with one embodiment of the present invention.
Figure 2:
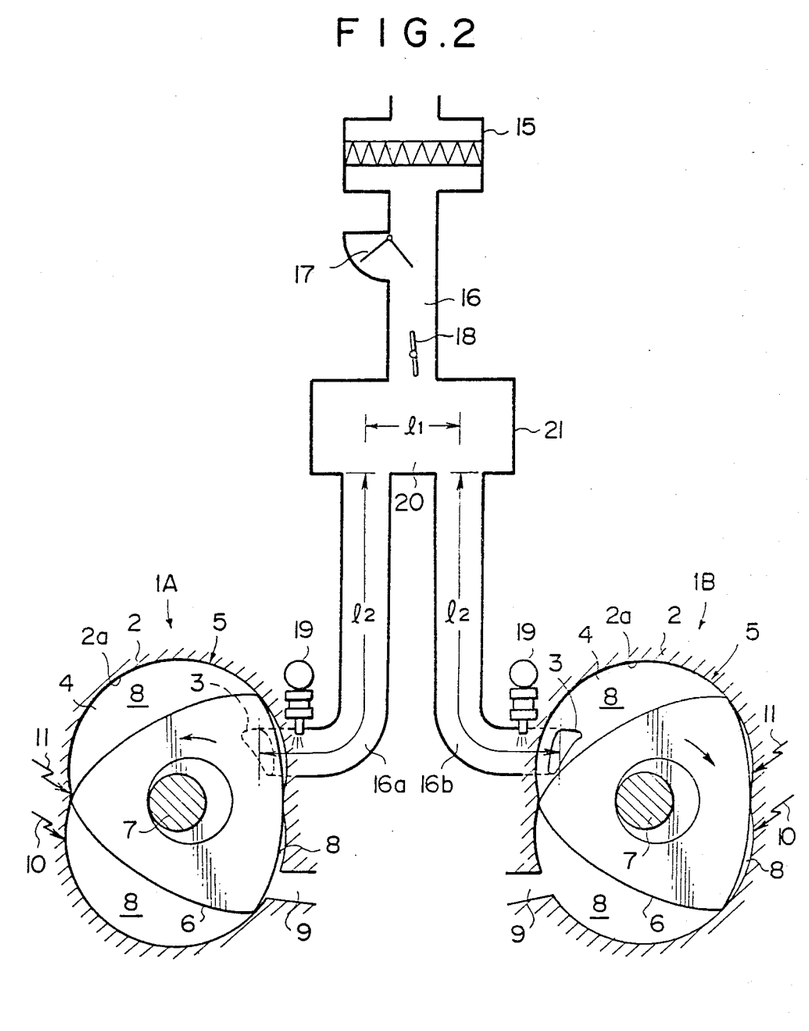
FIG. 2 is a diagrammatical illustration of the intake system employed in the engine shown in FIG. 1.
Figure 3:
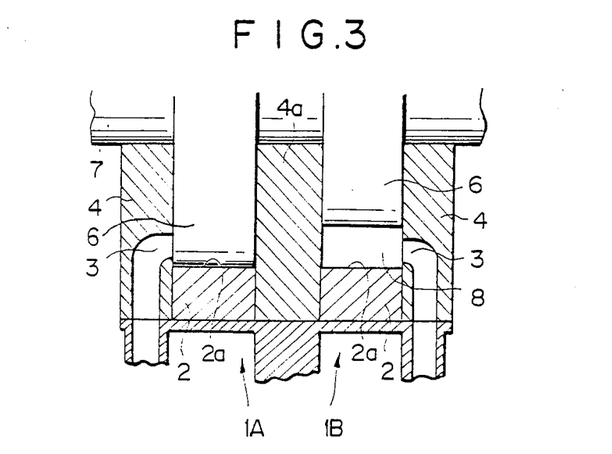
FIG. 3 is a sectional view taken substantially along the line III—III in FIG. 1.

Referring to the drawings, particularly to FIGS. 1 through 3, there is shown a two-rotor type rotary piston engine comprised of a pair of engine sections 1A and 1B. The engine sections 1A and 1B respectively have rotor housings 2 which are formed with inner walls 2a of trochoidal configuration. An intermediate housing 4a is located between the rotor housings 2 to separate them one from the other as shown in FIG. 3. The outer sides of the rotor housings 2 are attached with side housings 4 which are formed with intake ports 3. Thus, the rotor housings 2, the side housings 4 and the intermediate housing 4a constitute a casing 5 in which a pair of rotor cavities are defined.

In each of the rotor cavities, there is disposed a rotor 6 of substantially triangular configuration. The rotors 6 are carried by an eccentric shaft 7 and have apex portions provided with apex seals 13 and corner seals 14. Further, the rotors 6 are provided at their side surfaces with side seals 12. The rotors 6 are rotatable with their apex seals 13 in sliding contact with the inner walls 2a of the rotor housings 2. The side seals 12 are maintained n sliding contact with the surfaces of the side housings 4 and the intermediate housing 4a. Thus, in each of the rotor cavities in the casing 5, there are defined working chambers 8 of which volumes cyclically change as the rotor 6 rotates. The eccentric shaft 7 carried the rotors 6 with 180° phase difference between the rotors 6. The rotor housings 2 are formed with exhaust ports 9 and provided with ignition plugs 10 and 11.

The intake system of the engine includes an air cleaner 15 connected with a common intake passage 16 provided with an air-flow detector 17 and a throttle valve 18. The common intake passage leads to a surge tank 21 which is in turn connected with a pair of individual intake passages 16a and 16b leading respectively to the intake ports 3 opening to the respective rotor cavities. In the vicinity of each intake port 3, the side housing 4 is provided with a fuel injecting nozzle 19.

As well known in the art, the intake ports 3 are cyclically opened by the rotors 6 and the opening period of each intake port 3 is 270° to 320° in terms of angle of rotation of the eccentric shaft 7. In FIG. 2, it will be noted that the individual intake passages 16a and 16b are located downstream the throttle valve 18 and have lengths l₂. Further, the openings of the individual intake passages 16a and 16b are spaced apart by a distance l₁ in terms of a center-to-center spacing. The surge tank 21 thus provides a communication passage 20 for the individual intake passages 16 and 16b. Since the surge tank 21 has a relatively large volume, it is possible to transmit a compression wave from one individual intake passage to the other without any significant attenuation. The overall length L of the individual intake passages 16a and 16b and the communication passage 20 is calculated by the formula $$L = L_1 + 2l_2$$

and this overal length is determined at a value between 0.57 and 1.37 m.

Figure 4:
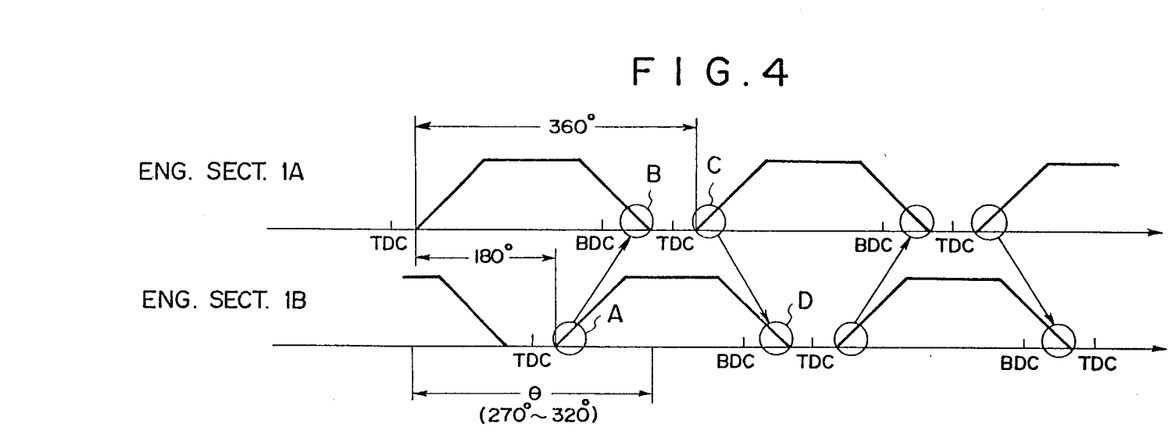
FIG. 4 is a diagram showing intake port timings in the engine shown in FIGS. 1 through 3.
Figure 5:
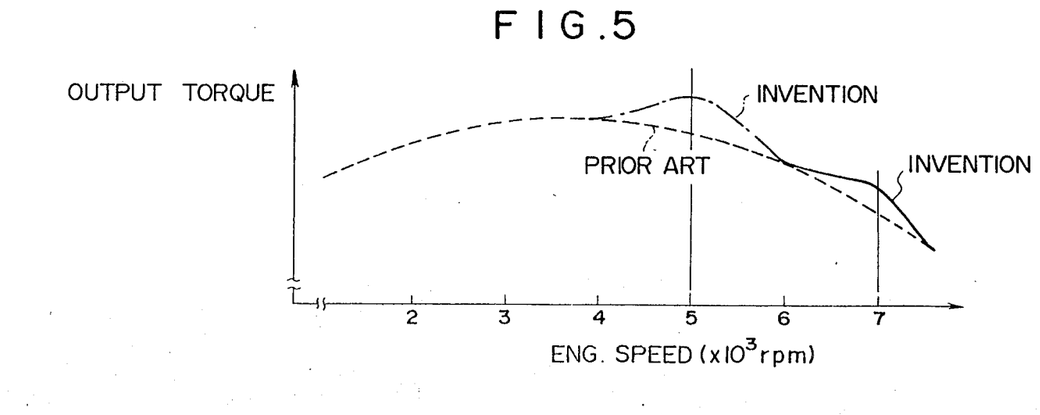
FIG. 5 is an engine output torque curve showing the improvement accomplished by the present invention.

Referring now to FIG. 4, under the engine speed of 5000 to 7000 rpm, the compression wave is produced at the intake port 3 of one engine section, for example, the engine section 1B when the subject intake port 3 is opened as shown at A. The compression wave is transmitted through the individual passages 16a and 16b and the communication passage 20 to the intake port 3 of the other engine section, for example, the engine section 1A. Since the overall length L is determined as described previously, the compression wave reaches the intake port 3 in the said other engine section just before the subject intake port 3 is closed as shown by B. The compression wave functions to prevent blow-back of intake gas from the intake working chamber at the final stage of the intake stroke and provide an additional charge. Similarly, the compression wave produced at the intake port 3 of the engine section 1A as shown by C in FIG. 4 is transmitted to the intake port 3 of the engine section 1B just before the intake port 3 is closed as shown by D. Thus, it is possible to obtain an increase in the engine output torque as shown by the full line curve or by the dotted line curve depending on the value of the overall length L.

Figure 6:
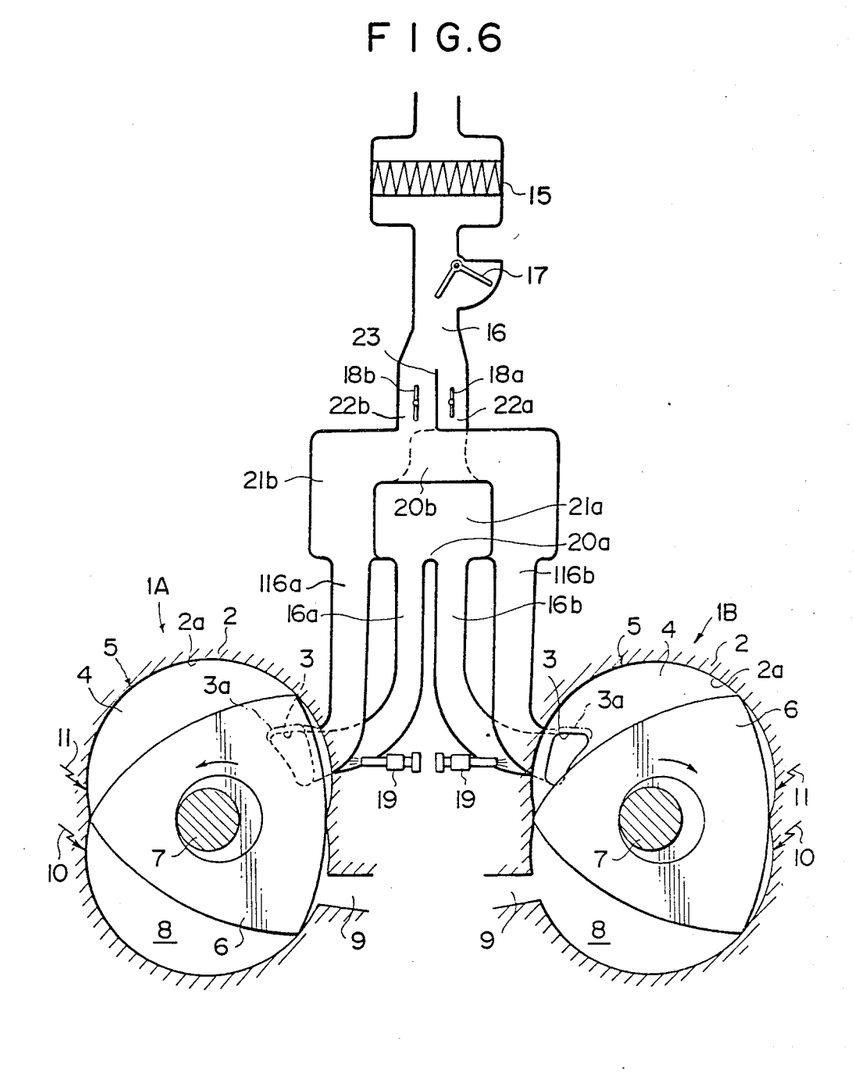
FIG. 6 is a view similar to FIG. 2 but showing another embodiment of the present invention.
Figure 7:
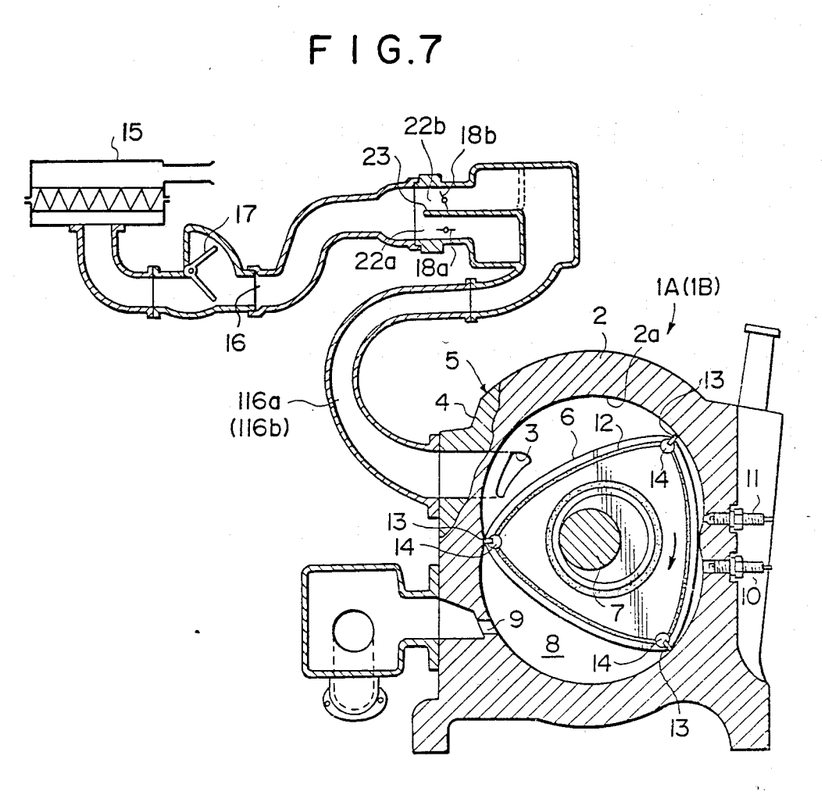
FIG. 7 is a sectional view of the engine shown in FIG. 6.
Figure 8:
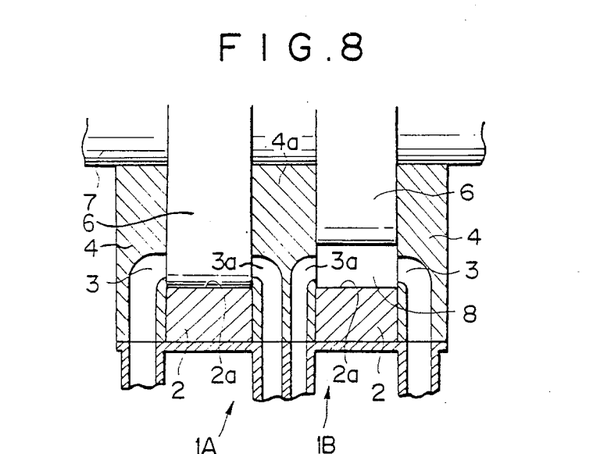
FIG. 8 is a sectional view similar to FIG. 3 but showing the embodiment of FIGS. 6 and 7.

Referring now to FIGS. 6 through 8, there is shown another embodiment of the present invention. In this embodiment, the basic structure of the engine is similar to that of the previous embodiment so that corresponding parts are designated by the same reference numerals as in the previous embodiment. The present embodiment is different from the previous one in that the intermediate housing 4a is formed with auxiliary intake ports 3a opening to the respective ones of the rotor cavities. As shown in FIG. 6, the auxiliary intake port 3a is formed so that it is opened substantially at the same time with the intake port 3 opening to the same rotor cavity but closed later than the intake port 3.

The intake system includes an air-cleaner 15 connected with a common intake passage 16 provided with an air-flow detector 17. The common intake passage 16 is separated at the downstream portion by a partition wall 23 into a primary and secondary passages 22a and 22b which are respectively provided with a primary and secondary throttle valves 18a and 18b. The primary passage 22a is connected with a surge tank 21a which is in turn connected with individual intake passages 16a and 16b leading respectively to the intake ports 3 formed in the side housings 3. In the surge tank 21a, there is therefore defined a communication passage 20a connecting the individual passages 16a and 16b. The secondary passage 22b is connected with a surge tank 21b which is in turn connected with individual passages 116a and 116b leading to the respective ones of the auxiliary intake ports 3a. The surge tank 21b provides a communication passage between the individual intake passages 116a and 116b. The secondary throttle valve 18b is normally closed and starts to open when the throttle operating member is further actuated after the primary throttle valve 18a is opened beyond a predetermined position or substantially fully opened. In this embodiment, fuel injection nozzles 19 are provided in the individual intake passages 16a and 16b in the vicinity of the intake ports 3.

In this embodiment, the intake ports 3a have a port opening period of 270° to 320° in terms of the angle of rotation of the eccentric shaft 7 but the intake ports 3 have a port opening period of 230° to 290°. The port opening period of the ports 3 is determined in view of the fact that these ports 3 are used under a light load engine operation. The port opening period of 230° is required for ensuring a charge for engine operation whereas the period 290° is determined in view of preventing intake gas blow back under a light load operation.

The lengths of the individual intake passage 16a and 16b and the length of the communication passage 20a are determined so that the overal length becomes between 0.57 and 1.37 m. The lengths of the individual intake passages 116a and 116b and the length of the communication passage formed in the surge tank 21b are determined so that the overall length becomes 0.25 to 1.03 m. Alternatively, the passages 16a, 16b and 20a may not satisfy the above requirement but only the passages 116a, 116b and the communication passage in the surge tank may meet the requirement.

Figure 9:
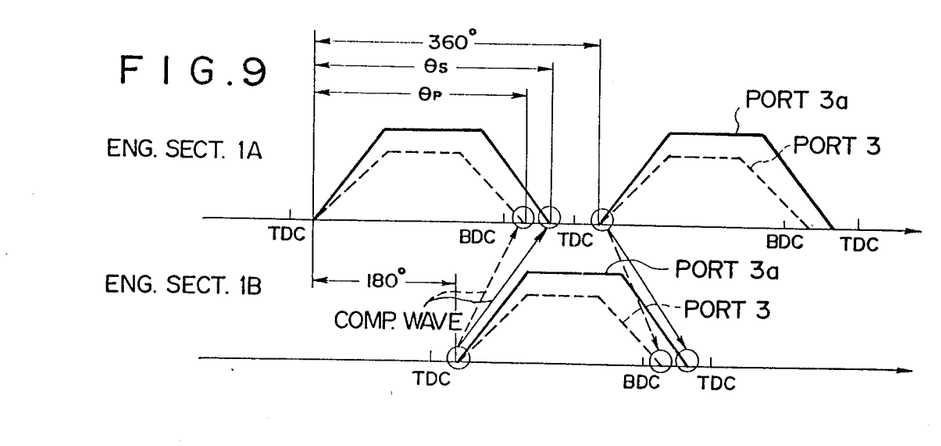
FIG. 9 is an intake port timing chart.
Figure 10:
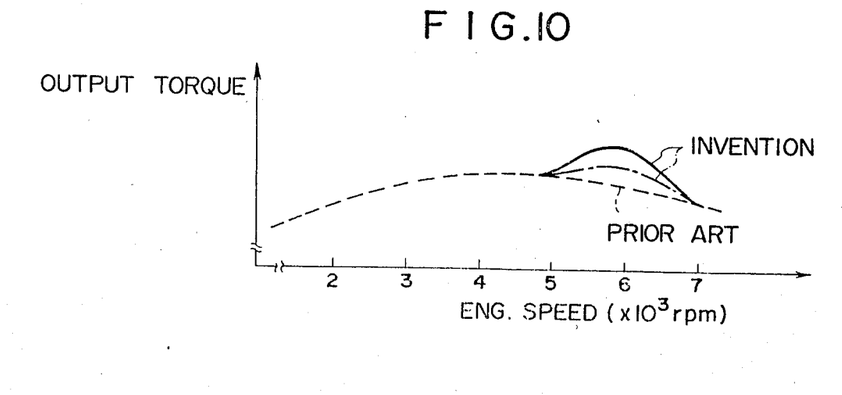
FIG. 10 is an engine output torque curve in the engine shown in FIGS. 6 through 9; and, FIG. 11 is an intake port timing chart in another embodiment.

Referring to FIG. 9, it will be noted that the compression waves produced in one engine section are transmitted to the intake ports of the other engine section just before the intake ports are closed under a high speed operation of the engine. Therefore, it is possible to obtain an increased engine output as shown in FIG. 10.

Figure 11:
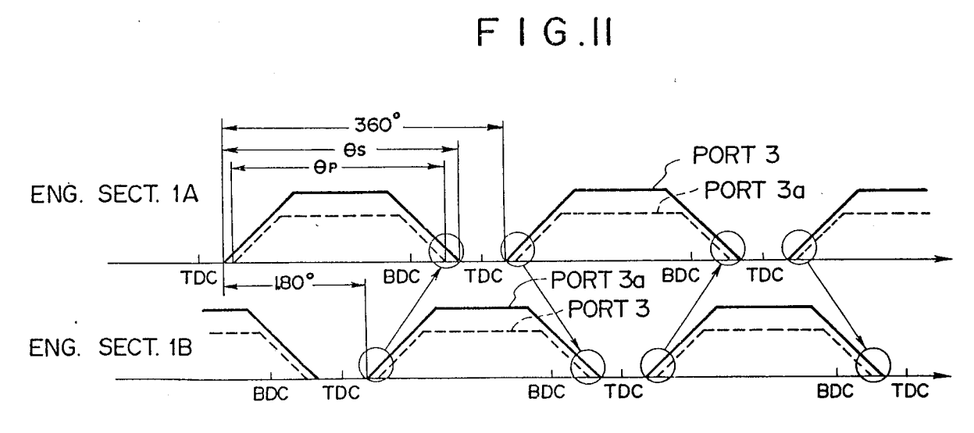

FIG. 11 shows another example having a modified intake port timing. In this example, the auxiliary intake port 3a for high load operation is opened earlier than the intake port 3 and closed later than the intake port 3. In this port timings, it is also possible to obtain similar results.

The invention is applicable not only to a fuel injection type engine but also to a carburetor type engine although the application to a fuel injection type engine is more preferable than to a carburetor type engine. It should further be noted that the invention can also be applied to a supercharged engine without any difficulty.

The invention has thus been shown and described with reference to specific embodiments, however, it should be noted that the invention is in no way limited to the details of the illustrated structures but changes and modifications may be made without departing from the scope of the appended claims.

What is claimed is:

1. A two rotor type rotary piston engine comprising:
   a casing comprised of
       a pair of rotor housings, each rotor housing having an inner wall of trochoidal configuration, an intermediate housing located between the rotor housings, and a pair of side housing secured to outer sides of the respective rotor housings to define rotor cavities in the respective rotor housings, a pair of substantially polygonal rotors disposed in the respective rotor cavities with apex portions in sliding engagement with the inner walls of the respective rotor housings to define working chambers of cyclically variable volumes, eccentric shaft means carrying said rotors so that said rotors are rotated with 180° phase difference in terms of angle of rotation of said eccentric shaft means, intake means including two individual intake port means provided in at least one of said intermediate and side housings to open to the respective rotor cavities and being cyclically closed by said rotors as the rotors rotate, intake passage means including throttle valve means, and two individual passage means leading respectively to said two individual intake port means, communicating passage means located downstream of said throttle valve means and communicating with said two individual passage means, said two individual intake port means having an opening period of 270° to 320° in terms of the angle of rotation of said eccentric shaft means, said communication passage means and said two individual passage means leading to the respective rotor cavities having an overall length between 0.57 to 1.37 m for transmitting a compression wave produced in one of said two individual passage means in opening timing of one of said two individual intake port means to the other of said two individual intake port means just before said other of said two individual intake port means is closed to obtain an additional intake charge in an engine speed range of 5000 to 7000 rpm.

2. A rotary piston engine in accordance with claim 1 further comprising fuel injection nozzle means provided in said two individual passage means and said fuel injection nozzle means being located downstream from said communicating passage means in a flow path of intake air.

3. A rotary piston engine in accordance with claim 1 wherein said communication passage means includes enlarged chamber means.

4. A rotary piston engine in accordance with claim 1 wherein said intermediate housing is formed with another two individual intake port means respectively opening to said rotor cavities, each of said side housings being formed with one of said two individual intake port means respectively opening to said rotor cavities, one of said two individual intake port means opening to one rotor cavity being connected with the other of said two individual intake port means opening to the other rotor cavity through said two individual passage means and said communicating passage means.

5. A rotary piston engine in accordance with claim 4 in which valve means allow intake gas flow to said two individual passage means connected with each other by said communicating passage means under a high load engine operation.

6. A rotary piston engine in accordance with claim 4 in which said two individual intake port means connected together by said two individual passage means and said communicating passage means are located so that they are closed earlier than said other two individual intake port means.

7. A rotary piston engine in accordance with claim 4 in which one of the other two individual intake port means opening to one rotor cavity is connected with the other of said other two individual intake port means opening to the other rotor cavity through further passage means having an overall length between 0.25 and 1.03 m, said other two individual intake port means having an opening period of 230° to 290° in terms of angle of rotation of said eccentric shaft means.

8. A two-rotor type rotary piston engine comprising:
a casing comprised of a pair of rotor housings each having an inner wall of trochoidal configuration, an intermediate housing located between the rotor housing, and a pair of side housings secured to outer sides of the respective rotor housings to define rotor cavities in the respective rotor housings, a pair of substantially polygonal rotors disposed in the respective rotor cavities with apex portions in sliding engagement with the inner walls of the respective rotor housings to define working chambers of cyclically variable volumes, eccentric shaft means carrying said rotors so that said rotors are rotated with 180° phase difference in terms of angle of rotation of said eccentric shaft means, intake means including a pair of first intake port means formed in said side housings to open to respective ones of the rotor cavities, a pair of second intake port means formed in said intermediate housing to open to respective ones of the rotor cavities, and one of said pair of first intake port means and said pair of second intake port means having a port opening period of 230° to 290° in terms of the angle of rotation of said eccentric shaft means, and passage means connecting said one pair of intake port means and said passage means having an overall length of 0.57 to 1.37 m for transmitting a compression wave produced in one rotor cavity to the other rotor cavity just before one of said one pair of intake port means located in said one rotor cavity is closed to obtain an additional intake charge in an engine speed range of 5000 to 7000 rpm, valve means allowing intake gas flow to said passage means, and further passage means for supplying intake gas flow to the other of said pair of first intake port means and said pair of second intake port means.

9. A rotary piston engine in accordance with claim 8 in which said other pair of intake port means have a port opening period of 270° to 320° in terms of the angle of rotation of the eccentric shaft means, and said other pair of intake port means being connected together by second passage means having an overall length of 0.25 to 1.03 m.

* * * * *